(12) United States Patent
Shimazawa et al.

(10) Patent No.: US 7,948,710 B2
(45) Date of Patent: May 24, 2011

(54) HEAT-ASSISTED THIN-FILM MAGNETIC HEAD AND HEAT-ASSISTED MAGNETIC RECORDING METHOD

(75) Inventors: Koji Shimazawa, Tokyo (JP); Daisuke Miyauchi, Tokyo (JP); Katsuki Kurihara, Tokyo (JP)

(73) Assignee: TDK Corporation, Tokyo (JP)

( * ) Notice: Subject to any disclaimer, the term of this patent is extended or adjusted under 35 U.S.C. 154(b) by 526 days.

(21) Appl. No.: 12/177,501

(22) Filed: Jul. 22, 2008

(65) Prior Publication Data
US 2010/0020431 A1 Jan. 28, 2010

(51) Int. Cl.
*G11B 5/02* (2006.01)
(52) U.S. Cl. .................................... 360/125.3
(58) Field of Classification Search .......... 360/125.3
See application file for complete search history.

(56) References Cited

U.S. PATENT DOCUMENTS

| | | | |
|---|---|---|---|
| 6,768,556 B1 | 7/2004 | Matsumoto et al. | |
| 2006/0222904 A1* | 10/2006 | Hsia et al. | 428/832 |
| 2008/0218891 A1* | 9/2008 | Gubbins et al. | 360/59 |
| 2009/0040644 A1* | 2/2009 | Lu et al. | 360/59 |

FOREIGN PATENT DOCUMENTS

| | | |
|---|---|---|
| JP | A-10-162444 | 6/1998 |
| JP | A-2000-207702 | 7/2000 |
| JP | A-2003-534622 | 11/2003 |
| JP | A-2004-158067 | 6/2004 |
| JP | A-2005-4901 | 1/2005 |
| JP | A-2005-190655 | 7/2005 |
| WO | WO 01/91114 A1 | 11/2001 |

OTHER PUBLICATIONS

Miyanishi et al., "Near-Field Assisted Magnetic Recording" IEEE Transactions on Magnetics, vol. 41, No. 10, pp. 2817-2821; Oct. 2005.

Thiele et al., "Temperature dependent magnetic properties of highly chemically ordered $Fe_{55-x}Ni_xPt_{45}L1_0$ films" Journal of Applied Physics, vol. 91, No. 10, pp. 6595-6600, May 15, 2002.

* cited by examiner

*Primary Examiner* — Mark Blouin
(74) *Attorney, Agent, or Firm* — Oliff & Berridge, PLC

(57) ABSTRACT

In a heat-assisted magnetic recording, a thin-film magnetic head, which can form stable recording bits pattern having steep magnetization transition regions without using a near-field light generating element, is provided. The head is formed on an element forming surface of a substrate, and has a waveguide for leading a light for heat-assist to a magnetic medium and a write element formed on a trailing side of the waveguide and having a magnetic pole for applying a write field to the medium. Here, a write field profile, which is an intensity distribution of the write field from the pole along a track in a recoding layer of the medium, has a projecting region on a leading side. Further, an anisotropy field profile, which is a distribution of an anisotropy field when the anisotropy field is reduced by irradiating the light on a part of the recoding layer, traverses the projecting region.

14 Claims, 10 Drawing Sheets

Fig. 7
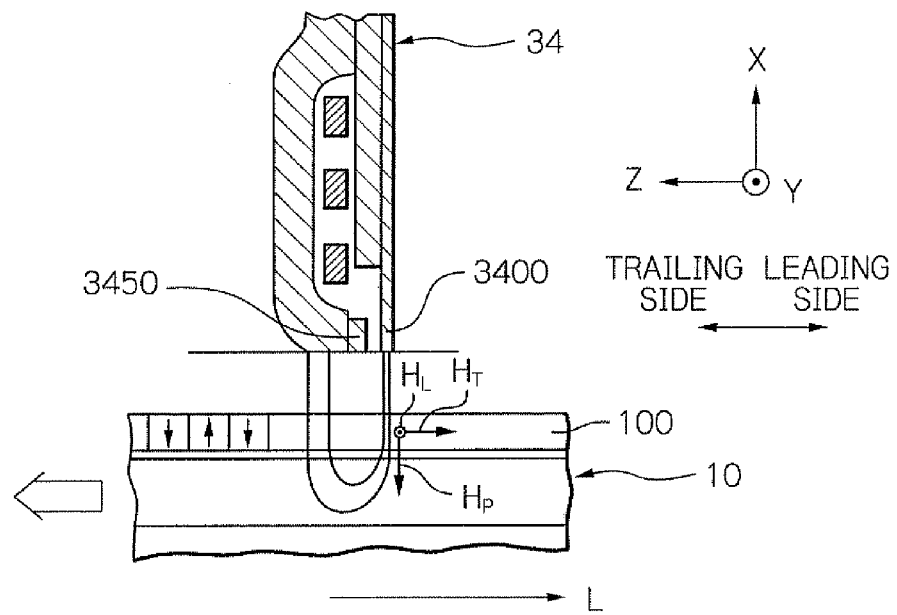
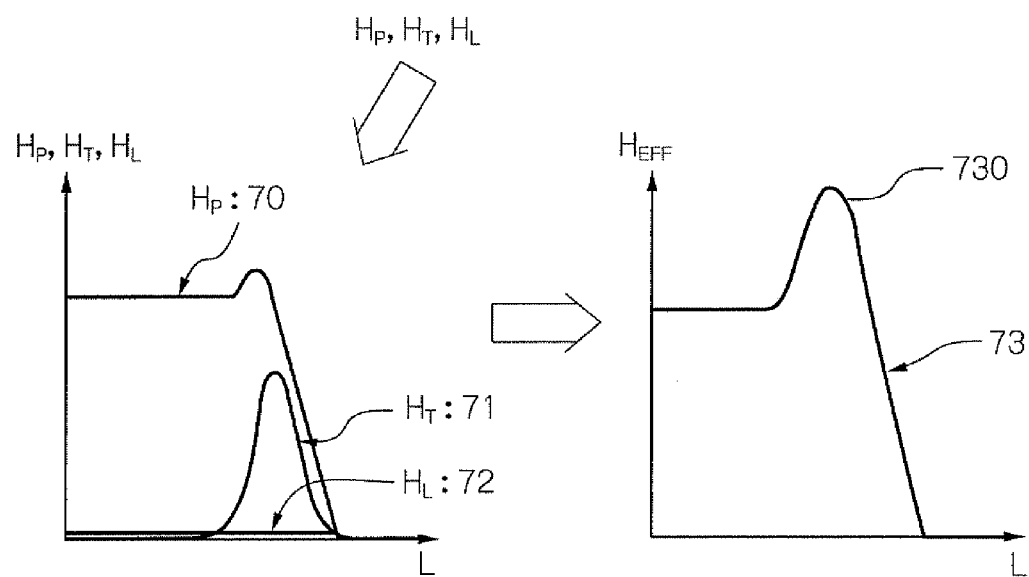

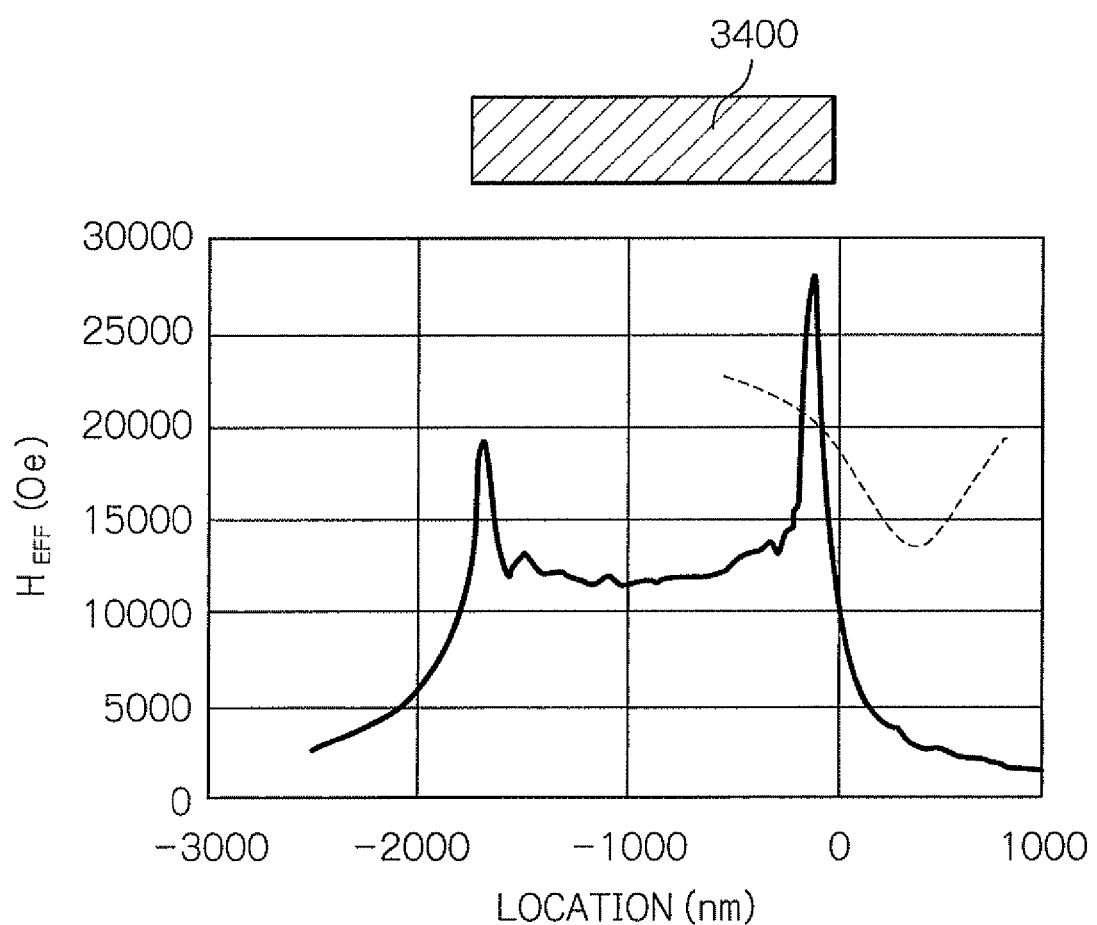

HEAT-ASSISTED THIN-FILM MAGNETIC HEAD AND HEAT-ASSISTED MAGNETIC RECORDING METHOD

BACKGROUND OF THE INVENTION

1. Field of the Invention

The present invention relates to a heat-assisted magnetic recording method, which performs magnetic recording by irradiating a light to a magnetic recording medium to reduce an anisotropy field of the magnetic recording medium, and a thin-film magnetic head, which writes data using the heat-assisted magnetic recording method.

2. Description of the Related Art

With increasing recording density of magnetic disk drive apparatuses, it is required to improve the performance of thin-film magnetic heads. Composite-type thin-film magnetic heads, which have a stacked structure of a magnetoresistive (MR) element for reading data signals and an electromagnetic transducer for writing data signals, are widely used as such thin-film magnetic heads.

Generally, magnetic recording media are magnetically discontinuous, in which magnetic microparticles are gathered together, and each of magnetic microparticles has a single magnetic-domain structure. Here one recording bit consists of a plurality of magnetic microparticles. Therefore, for improving its recording density, irregularity in boundaries of recording bits should be reduced by decreasing the size or volume of magnetic microparticles. However, thermal stability of the magnetization of recording bits is degraded by decreasing the size of magnetic microparticles.

As a measure against the thermal stability problem, it may be possible to increase a magnetic anisotropy energy $K_U$ of magnetic microparticles. However, increment of the energy $K_U$ causes increment of a coercive force of magnetic recording media. Whereas, the intensity of a write magnetic field of thin-film magnetic heads is limited by saturation magnetic flux density of soft-magnetic pole material, which forms a magnetic core of heads. Therefore, heads cannot write data to magnetic recording media when the coercive force of media exceeds the maximum limit of the write magnetic field.

Currently, as a method for solving the thermal stability problem, a heat-assisted magnetic recording technique is proposed, in which a magnetic head writes data to a magnetic recording medium formed of a material with large magnetic anisotropy energy $K_U$ by supplying a heat to the medium to reduce the coercive force of the medium just before applying the write magnetic field. The heat-assisted magnetic recording technique has some similarity to a magneto-optic recording technique. However in the heat-assisted magnetic recording technique, the area of applied magnetic field determines spatial resolution of recording bits (that is, magnetic-field-dominant technique), while the area of emitted light determines spatial resolution of recording bits (that is, light-dominant technique) in the magneto-optic recording technique.

As proposed heat-assisted magnetic recording techniques, U.S. Pat. No. 6,768,556 discloses a near-field light probe, which has a strobilus shaped metal diffuser formed on a substrate and a dielectric material film formed around the diffuser, as an emitting unit for irradiating light to the magnetic recording medium. Japanese patent Publication No. 10-162444A discloses a head using a solid immersion lens in a recording and reproducing apparatus. Further, Japanese patent publication No. 2004-158067A discloses a diffuser as a near-field light probe, which is formed in contact with a main magnetic pole of a head for perpendicular magnetic recording in such a way that a irradiated surface of the diffuser is perpendicular to a medium surface. Furthermore, Miyanishi et al. "Near-field Assisted Magnetic Recording" IEEE TRANSACTIONS ON MAGNETICS, Vol. 41, No. 10, p. 2817-2821 (2005) discloses a U-shaped near-field light probe formed on a quartz crystal slider. Further, Japanese patent publication No. 2005-4901A discloses a technique, which can apply an appropriate write magnetic field to a heated area of a magnetic recording medium by manipulating a gradient of the write magnetic field and so on, even though a light emitting unit is provided around an trailing side end surface of a main magnetic pole.

As described above, various forms of heat-assisted magnetic recording techniques are proposed. However, following problems arise to realize heat-assisted magnetic recording using a near-field light generating element such as the near-field light probe described above.

In case the near-field light generating element is provided on the trailing side (opposite side to the substrate) with reference to the main magnetic pole of the head, the irradiating center of the near-field light should be closed to the main magnetic pole enough. For example, in case the trailing side gradient of the write magnetic field profile, which is a intensity distribution of the write magnetic field along the track, is 100 Oe(Oersted)/nm, the maximum of the write magnetic field is 10 kOe, and a write magnetic field more than or equal to 5 kOe is required for writing to the magnetic disk, a distance between the main magnetic pole and the irradiating center of the near-field light need to be adjusted less than or equal to 50 nm. Further, in case the gradient of magnetic field need to be increased, for example, by 500 Oe/nm for high recording density, the distance need to be further decreased.

On the other hand, the near-field light generating element generally generates a near-field light by receiving a light propagated through the waveguide. The waveguides is formed by surrounding a higher refractive index region (core) using a lower refractive index region (clad). To keep functions as the waveguide, a thickness of each region need to be set almost the same as or more than the wavelength of the light to be propagated. In case of using a blue laser, which is normally used for the high density optical recording, a thickness of the clad need to be approximately 400 nm or more, and the efficiency of the light propagation is dramatically degraded using clad thinner than 400 nm. As a result, the near-field light generating element, which is provided at the end surface of the waveguide, cannot be placed close enough to the main magnetic pole.

It is considerable to place the near-field light generating element on the leading side (substrate side) with reference to the main magnetic pole. For example, Japanese patent publication No. 2005-190655A discloses a configuration, in which a light emitting element as a heat source is provided on the leading side of the magnetic pole for writing. In this case, recording bits can be damaged, because magnetization transition regions of recording bits are disturbed by receiving a higher write magnetic field after writing, in addition to the difficulty of shortening the distance between the near-field light generating element and the main magnetic pole.

On the contrary, Miyanishi et al. "Near-field Assisted Magnetic Recording" IEEE TRANSACTIONS ON MAGNETICS, Vol. 41, No. 10, p. 2817-2821 (2005) proposes a structure, in which a near-field light generating element and a write magnetic field generating element are placed at the same point. However, this structure does not include a main magnetic pole, and an applicable write magnetic field is limited. Moreover, it is difficult to realize the near-field light generating element with enough generating efficiency so far, in addition to problems listed above. Especially, the generating efficiency is not enough to supply the appropriate heat to the magnetic recording medium, which rotates high speed, for example approximately 7200 rpm.

From above considerations, the heat-assisted magnetic recording without using the near-field light generating element is expected. However, it is not possible to realize the good heat-assisted magnetic recording by just using a light supplying unit, which can supply a light with a big spot diameter. For example, in case the light supplying unit, which can supply the light with a big spot diameter, is placed on the trailing side with reference to the main magnetic pole, recording bits may be damaged, because magnetization transition regions of recording bits are disturbed by being exposed to higher temperature after writing. On the other hand, in case the light supplying unit is placed on the leading side with reference to the main magnetic pole, magnetization transition regions of recording bits are eventually decided under the condition that gradients of both the magnetic field and the temperature are small, and therefore it is very difficult to achieve a high line recording density.

BRIEF SUMMARY OF THE INVENTION

It is therefore an object of the present invention to provide a thin-film magnetic head, which can form stable recording bits pattern having steep magnetization transition regions without using a near-field light generating element, a head gimbal assembly (HGA) having the thin-film magnetic head, and an recording apparatus having the HGA.

Further, it is also an object of the present invention to provide a heat-assisted magnetic recording method, which can form stable recording bits pattern having steep magnetization transition regions without using a near-field light emission.

Before describing the present invention, terms used herein will be defined. In a multilayer or element structure formed on/above a element forming surface of a slider substrate of the thin-film magnetic head according to the invention, "lower" indicates the substrate side from a referenced layer or element, and "upper" indicates the opposite side. Further, a substrate side of a layer or element is referred as "lower portion", and the opposite side of the layer or element is referred as "upper portion". Moreover, in some figures showing embodiments of the thin-film magnetic head according to the invention, "X direction", "Y direction" and "Z direction" are defined according to need.

According to the invention, a thin-film magnetic head is formed on an element forming surface of a substrate, and has a waveguide for leading a light for heat-assist to a magnetic recording medium and a write head element formed on a trailing side of the waveguide and having a magnetic pole for applying a write magnetic field to the magnetic recording medium, where a write magnetic field profile, which is a intensity distribution of the write magnetic field from the magnetic pole along a track in a recoding layer of the magnetic recoding medium, has a projecting region on a leading side, and an anisotropy field profile, which is a distribution of an anisotropy field along the track when the anisotropy field is reduced by irradiating the light from the waveguide on a part of the recoding layer, traverses the projecting region of the write magnetic field profile.

Using the thin-film magnetic head, magnetization transition regions of recording bits formed on the magnetic recoding medium are eventually decided at the trailing side cross point of the projecting region, where the gradient of the magnetic field is very big. Thus, magnetization transition regions become steep, and it is possible to make recording bits smaller and to achieve a high line recording density. Moreover, recording bits are not exposed to high temperature after writing. As a result, magnetizations of recording bits are stable, and it may contribute to improve the signal to noise ratio. As explained above, it is possible to form stable recording bits pattern, which have precipitous magnetization transition regions, without using the near-field light generating element, and it contributes to improve both line recording density and signal to noise ratio.

Favorably, a value $EH_{XP}$ of the write magnetic field at a trailing side cross point on the projecting region of the write magnetic field profile and the anisotropy field profile satisfies a relation of $0.2(EH_{MAX}-EH_{MIN})<=EH_{XP}-EH_{MIN}<=0.8(EH_{MAX}-EH_{MIN})$, where $EH_{MIN}$ is the minimum write magnetic field value of a flat region of the write magnetic field profile, and $EH_{MAX}$ is the maximum write magnetic field value of the projecting region. This improves the signal to noise ratio steadily. Advantageously, the minimum anisotropy field value $HK_{MIN}$ of the anisotropy field profile satisfies a relation of $HK_{MIN}>EH_{MIN}$. With this configuration, it is possible to prevent the adjacent track erasure (ATE), which unintentionally erases the data of adjacent tracks.

Favorably, the waveguide does not include a near-field light generating element, the waveguide acts as a core, and an insulating layer surrounding the waveguide acts as a clad. Further, it is favorable that a light source for generating the light for heat-assist is provided on or adjacent to a end surface opposite to a medium facing surface of the waveguide.

According to the invention, a head gimbal assembly (HGA) has a suspension and the thin-film magnetic described above, which is attached on the suspension.

According to the invention, a magnetic recording apparatus has the HGA described above, at least one magnetic recording medium and a recording and light-emitting control circuit for controlling both a emitting operation of the light, which is propagated through the waveguide, and a write operation performed by the thin-film magnetic head to at least one magnetic recording medium. It is preferable that the magnetic recording apparatus has a light source, which generates the light for heat-assist, on or adjacent to an end surface opposite to a medium facing surface of the waveguide.

According to the invention, a heat-assisted magnetic recording method has the steps of setting a write magnetic field profile such that it has a projecting region on a leading side, where the write magnetic field profile is a intensity distribution of the write magnetic field along a track in a recoding layer of a magnetic recording medium, and reducing an part of an anisotropy field such that an anisotropy field profile traverses the projecting region of the write magnetic field profile by irradiating a light on a part of the recording layer, where the anisotropy field profile is a distribution of the anisotropy field along the track in the recording layer, and the part of the recording layer is a leading side part with reference to a center of the write magnetic field profile In the method, it is preferable that a value $EH_{XP}$ of the write magnetic field at a trailing side cross point of the projecting region of the write magnetic field profile and the anisotropy field profile satisfies a relation of $0.2(EH_{MAX}-EH_{MIN})<=EH_{XP}-EH_{MIN}<=0.8(EH_{MAX}-EH_{MIN})$, where $EH_{MIN}$ is the minimum write magnetic field value of a flat region of the write magnetic field profile, and $EH_{MAX}$ is the maximum write magnetic field value of the projecting region. Further, it is preferable that the minimum anisotropy field value $HK_{MIN}$ of the anisotropy field profile satisfies a relation of $HK_{MIN}>EH_{MIN}$.

Further objects and advantages of the present invention will be apparent from the following description of preferred embodiments of the invention as illustrated in the accompanying figures. In each figure, the same element as an element shown in other figure is indicated by the same reference numeral. Further, the ratio of dimensions within an element and between elements becomes arbitrary for viewability.

BRIEF DESCRIPTION OF THE SEVERAL VIEWS OF THE DRAWINGS

FIG. 7 is an outline drawing for explaining an effective write magnetic field profile having a projecting region on the leading side;

FIG. 9 shows an effective write magnetic field profile of a main magnetic pole used for the example;

DETAILED DESCRIPTION OF THE INVENTION

Figure 1:
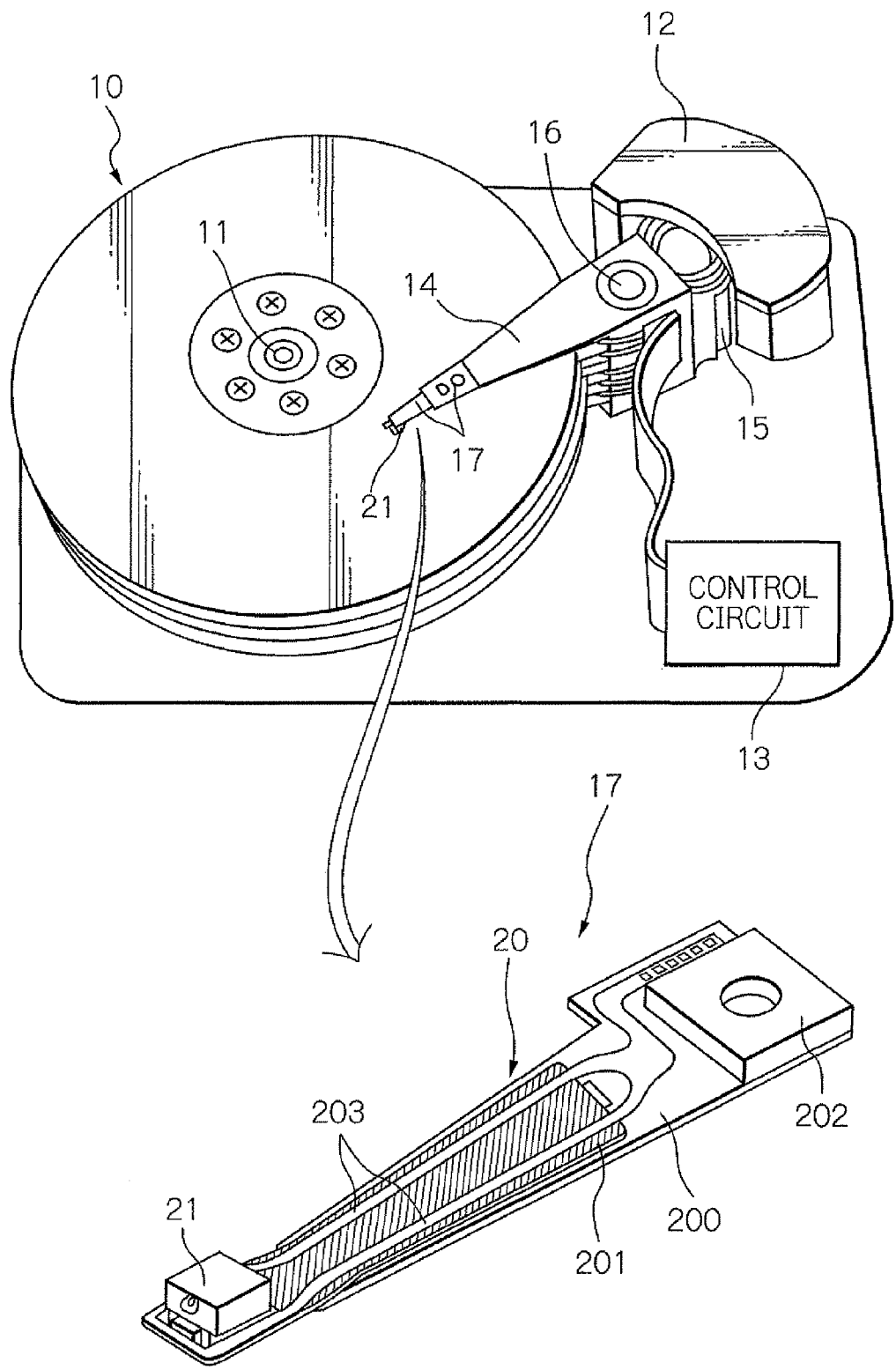
FIG. 1 shows perspective views schematically illustrating main configurations of one embodiment of a magnetic recording apparatus and an HGA according to the invention.

FIG. 1 shows perspective views schematically illustrating main configurations of one embodiment of a magnetic recording apparatus and an HGA according to the present invention. In the perspective view of the HGA, a side facing to a magnetic disk is turned upward.

A magnetic disk drive apparatus shown in FIG. 1, as the magnetic recording apparatus, includes a plurality of magnetic disks 10 as magnetic recording media rotating about a rotation axis of a spindle motor 11, an assembly carriage device 12 provided with a plurality of drive arms 14, HGAs (head gimbal assemblies) 17 attached on an end portion of each drive arm 14 respectively and provided with a thin-film magnetic head 21, and a recording/reproducing and light-emitting control circuit 13 for controlling read/write operations of the head 21 and controlling light-emitting operation of a laser diode as a light source that generates laser light used for heat-assisted magnetic recording described later.

In the embodiment, the magnetic disk 10 is for perpendicular magnetic recording, and has a structure, which a soft-magnetic under layer, an intermediate layer and a recording layer (or a perpendicular magnetization layer) are laminated in sequence on a disk substrate. The assembly carriage device 12 is provided for positioning the thin-film magnetic head 21 above a track formed on the magnetic disk 10, in which recording bits are aligned. In the device 12, drive arms 14 are stacked along a pivot bearing axis 16, and adapted to allow angular-pivoting about the axis 16 driven by a voice coil motor (VCM) 15. The structure of the magnetic disk drive apparatus according to the invention is not limited to the above-described one. The number of magnetic disks 10, drive arms 14, HGAs 17, and heads 21 may be a single.

Also as shown in FIG. 1, in the HGA 17, a suspension 20 includes a load beam 200, a flexure 201 having elasticity and fixed on the load beam 200, a base plate 202 provided on a base portion of the load beam 200, and a wiring member 203 provided on the flexure 201 and including lead conductors and connection pads electrically connected to both ends of lead conductors. The thin-film magnetic head 21 is fixed and supported on the flexure 201 or on the end portion of the suspension 20, in such a way to face the surface of each magnetic disk 10 with a predetermined spacing (flying height). Further, one end of the wiring member 203 is electrically connected to terminal electrodes of the heat-assisted magnetic recording head 21.

The structure of the suspension 20 is also not limited to the above-described one. A head drive IC chip may be attached at some midpoint of the suspension 20.

Figure 2:
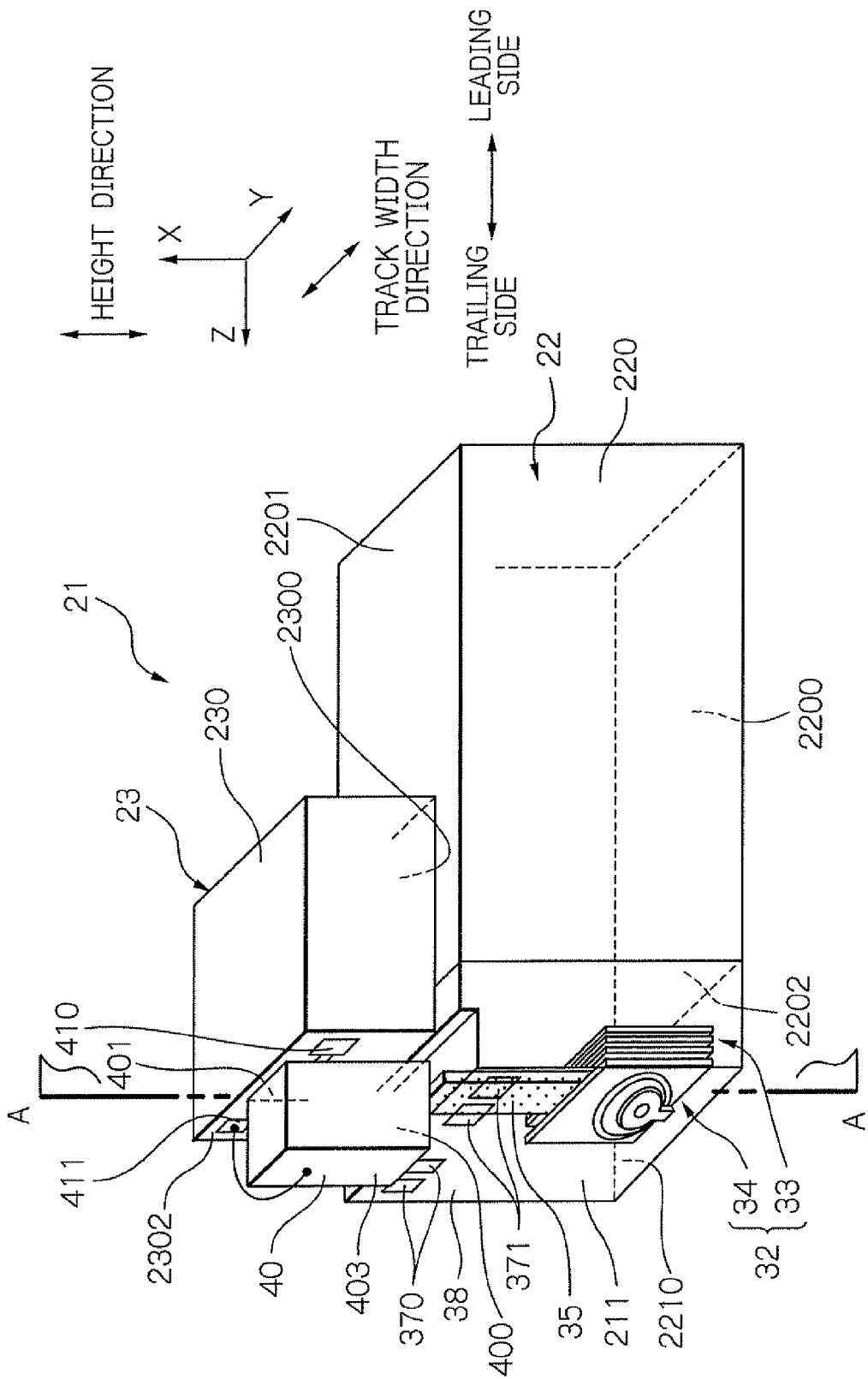
FIG. 2 shows a perspective view illustrating an embodiment of a thin-film magnetic head according to the invention.

FIG. 2 shows a perspective view illustrating an embodiment of the thin-film magnetic head 21 according to the invention.

As shown in FIG. 2, the thin-film magnetic head 21 includes a slider 22 and a light source unit 23. The slider 22 is formed of, for example, AlTiC ($Al_2O_3$—TiC), and includes a slider substrate 220 having an air bearing surface (ABS) 2200 processed so as to provide an appropriate flying height and a head-part 221 formed on an element forming surface 2202 perpendicular to the ABS 2200. The light source unit 23 is formed of, for example, AlTiC ($Al_2O_3$—TiC), and includes a unit substrate 230 having an joining surface 2300 and a laser diode 40 as a light source provided on a light source installation surface 2302 perpendicular to the joining surface 2300. Here, the slider 22 and the light source unit 23 are adhered to each other so that a back surface 2201 of the slider substrate 220 and the joining surface 2300 of the unit substrate 230 have a surface contact with each other. Here, the back surface 2201 of the slider substrate 220 is an end surface opposite to the ABS 2200 of the slider substrate 220.

The head-part 221 formed on the element forming surface 2202 of the slider substrate 220 in the slider 22 includes a head element 32 having a magnetoresistive (MR) element 33 for reading data from the magnetic disk and an electromagnetic transducer 34 for writing data to the magnetic disk, a waveguide 35 for leading a laser light from the laser diode 40 provided in the light source unit 23 to the medium facing surface, an overcoat layer 38 formed on the element forming surface 2202 to cover the MR element 33, the electromagnetic transducer 34 and the waveguide 35, a pair of terminal electrodes 370 exposed in an upper surface of the overcoat layer 38 and electrically connected to the MR element 33, and a pair of terminal electrodes 371 also exposed in the upper surface of the overcoat layer 38 and electrically connected to the electromagnetic transducer 34. The terminal electrodes 370 and 371 are electrically connected to connection pads of the wiring member 203 provided on the flexure 201 (FIG. 1).

One ends of the MR element 33, the electromagnetic transducer 34 and the waveguide 35 reach a head-part end surface 2210, which is a medium facing surface of the head-part 221. Here, the head-part end surface 2210 and the ABS 2200 form a medium facing surface of the head 21. The heat-assisted magnetic recording head 21 aeromechanically flies above the surface of the rotating magnetic disk with a predetermined flying height during actual write and read operations. Thus, ends of the MR element 33 and electromagnetic transducer 34 faces the surface of a magnetic recording layer of the magnetic disk with an appropriate magnetic spacing. In this state, the MR element 33 reads data by sensing a signal magnetic field from the magnetic recording layer, and the electromagnetic transducer 34 writes data by applying a signal magnetic field to the magnetic recording layer. When writing data, laser light, which is generated by the laser diode 40 in the light source unit 23 and propagated through the waveguide 35, is irradiated onto the recording layer of the magnetic disk, and heats a portion of the recording layer. As a result, the coercive force of the portion is decreased to a value, which can be written. The heat-assisted magnetic recording is performed by applying the write magnetic field to the portion, of which the coercive force is reduced, of the recording layer.

Here, the waveguide 35 is provided between the MR element 33 and the electromagnetic transducer 34, in other words, it is provided on the leading side (−Z direction) of the electromagnetic transducer 34. The thin-film magnetic head according to the invention can achieve good heat-assisted magnetic recording applicable for high recording density without using a near-field light generating element for generating a near-field light by a special arrangement including such a waveguide 35 as described later. It is possible to install the laser diode 40 on the slider 22 directly without using the light source unit 23.

Figure 3:
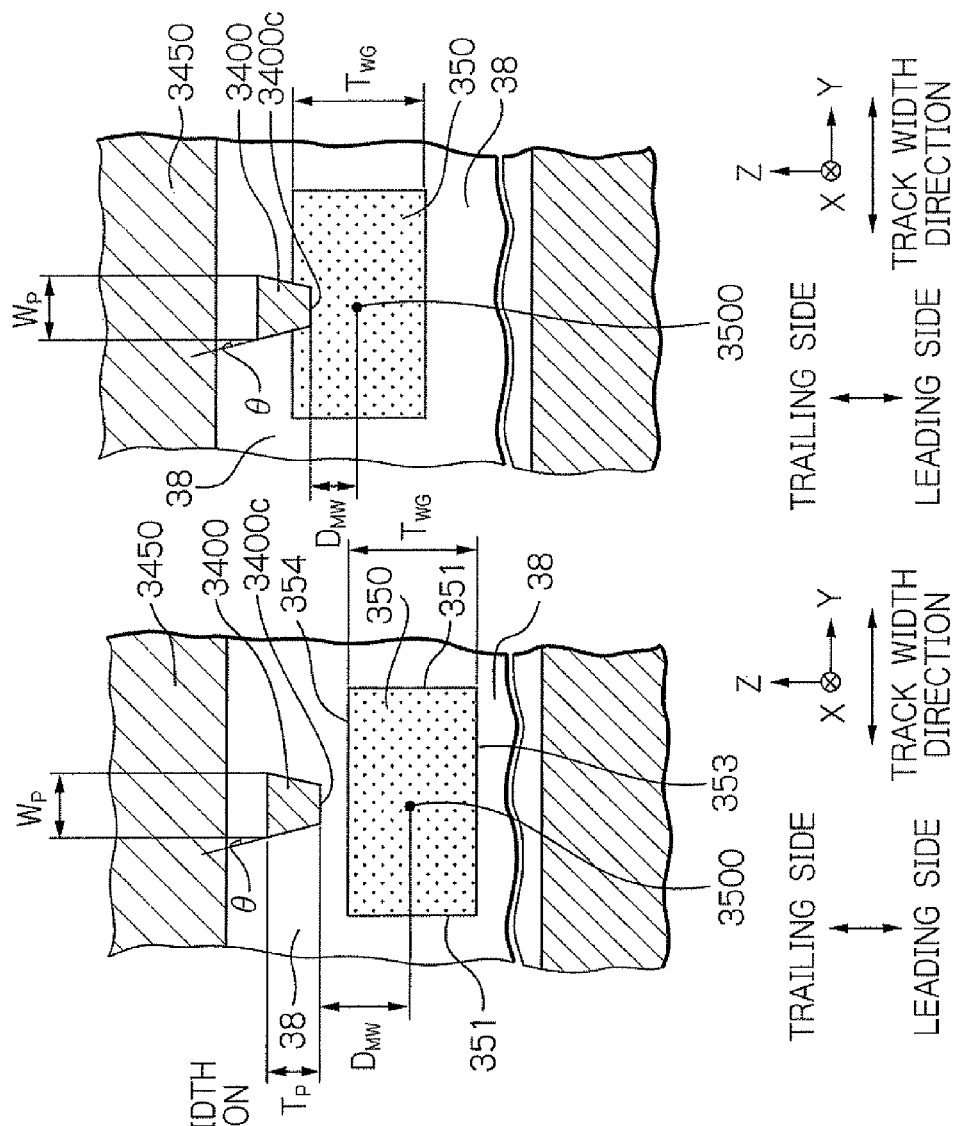
FIG. 3a shows a perspective view illustrating one embodiment of a waveguide.
FIGS. 3b and 3c show a plain view illustrating shapes of an electromagnetic transducer and the waveguide at a head-part end surface.

FIG. 3a shows a perspective view illustrating one embodiment of the waveguide 35, and FIGS. 3b and 3c show a plain view illustrating shapes of the electromagnetic transducer 34 and the waveguide 35 at the head-part end surface 2210.

As shown in FIG. 3a, the waveguide 35 is arranged parallel to the element forming surface 2202 and between the MR element 33 and the electromagnetic transducer 34, one end surface 350 of it extends to the head-part end surface 2210, and another end surface 352 extends to the opposite head-part end surface 2211. The waveguide 35 may have a rectangular parallelepiped shape, or may have a portion, which tapers in the track width direction (Y direction), on the head-part end surface 2210 side, as shown in FIG. 3a. The width $W_{WG}$ in the track width direction (Y direction) of the waveguide 35 may be, for example, in the range approximately from 1 to 200 μm (micrometers), and the thickness $T_{WG}$ (Z direction) may be, for example, in the range approximately from 0.1 to 4 μm, and the height $H_{WG}$ (X direction) may be, for example, in the range approximately from 10 to 300 μm.

Further, as shown in FIGS. 3a and 3b, both side surfaces 351, a lower surface 353 and a upper surface 354 of the waveguide 35 contact with the overcoat layer 38. The waveguide 35 is formed of a dielectric material with higher refractive index n than the one of the constituent material of the overcoat layer 38 using, for example, a sputtering method. For example, in the case that the overcoat layer 38 is formed of $SiO_2$ (n=1.5), the waveguide 35 can be formed of, for example, $Al_2O_3$ (n=1.63). Further, in the case that the overcoat layer 38 is formed of $Al_2O_3$ (n=1.63), the waveguide 35 can be formed of, for example, $SiO_xN_y$ (n=1.7-1.85), $Ta_2O_5$ (n=2.16), $Nb_2O_5$ (n=2.33), TiO (n=2.3-2.55) or $TiO_2$ (n=2.3-2.55). By forming the waveguide 35 using above described material, it is possible to reduce propagation loss of the laser light due to the excellent optical characteristics of the material. Further, the waveguide 35 acts as the core, while the overcoat layer 38 provides a function as a clad, and thus the total reflection condition is satisfied at side surfaces 351, the lower surface 353 and the upper surface 354. As a result, more amount of a laser light 48 can reach the end surface 350, which improves the propagation efficiency of the waveguide 35.

Moreover, as shown in FIG. 3b, the end surface 350 of the waveguide 35 is placed on the leading side (−Z direction) with reference to an end surface of a main magnetic pole 3400 (FIG. 4) of the electromagnetic transducer 34 at the head-part end surface 2210. Here a distance between a spot center 3500 of the laser light emitting from the end surface 350 of the waveguide 35 at the end surface 350 and a leading side (−Z direction) end surface 3400c of the main magnetic pole 3400 in the Z-axis direction is defined as $D_{MW}$. It is important to control a relation of a distribution of a write magnetic field to the one of an anisotropy field by adjusting $D_{MW}$ for heat-assisted magnetic recording of the invention as describing details later.

Furthermore, it is preferable that the waveguide 35 has a multilayered structure of dielectric materials, in which an upper layer has a higher refractive index n. The multilayered structure can be realized, for example, by sequentially stacking dielectric materials of $SiO_xN_y$ with changing the composition ratio X and Y appropriately. The number of stacked layers may be, for example, in the range from 8 to 12. In case that the laser light 48 is linearly polarized in Z-axis direction, the above-described structure enables the spot center 3500 of the laser light 48 at the end surface 350 to be closer to the electromagnetic transducer 34 in Z-axis direction. It is possible to realize the required value for $D_{MW}$ by selecting the number of layer, thickness of each layer and material of each layer of the multilayered structure.

As shown in FIG. 3c, in case the distance $D_{MW}$ is less than a half of thickness $T_{WG}$ (Z direction) of the waveguide 35 ($D_{MW}$<0.5 $T_{WG}$), the leading side end surface 3400C is surrounded by the waveguide 35. In this case, the spot center 3500 of the laser light is still located on the leading side (−Z direction) with reference to the end surface of the main magnetic pole 3400, and it is possible to achieve good heat-assisted magnetic recording as describing later.

Backing to FIG. 2, the light source unit 23 includes the unit substrate 230, the laser diode 40 provided on the light source-installation surface 2302 of the unit substrate 230, the terminal electrode 410 electrically connected to a lower surface 401, which acts as an electrode of the laser diode 40, and the terminal electrode 411 electrically connected to an upper surface 403, which acts as an electrode of the laser diode 40. Terminal electrodes 410 and 411 are connected to connection pads of the wiring member 203 provided on the flexure 201 (FIG. 1) respectively. By applying a predetermined voltage to the laser diode 40 via terminal electrodes 410 and 411, the laser light is radiated from an emission center on a light emitting surface 400 of the laser diode 40.

The thin-film magnetic head 21 is formed by joining the slider 22 and the light source unit 23. For this, the joining surface 2300 of the unit substrate 230 is joined to the back surface 2201 of the slide substrate 220, and the position between the unit substrate 230 and the slider substrate 220 is decided such that the light from the laser diode 40 is input to the end surface 352, which is opposite to the ABS 2200, of the waveguide 35.

The slider 22 and light source unit 23 may have an arbitrary size respectively. For example, the slider 22 may be so-called a femto slider in which the width in the track width direction (Y direction) is 700 µm, the length (Z direction) is 850 µm, and the thickness (X direction) is 230 µm. In this case, the light source unit 23 may be one size smaller than the slider 22, for example, in which the width in the track width direction is 425 µm, the length is 300 µm and the thickness is 300 µm.

Figure 4:
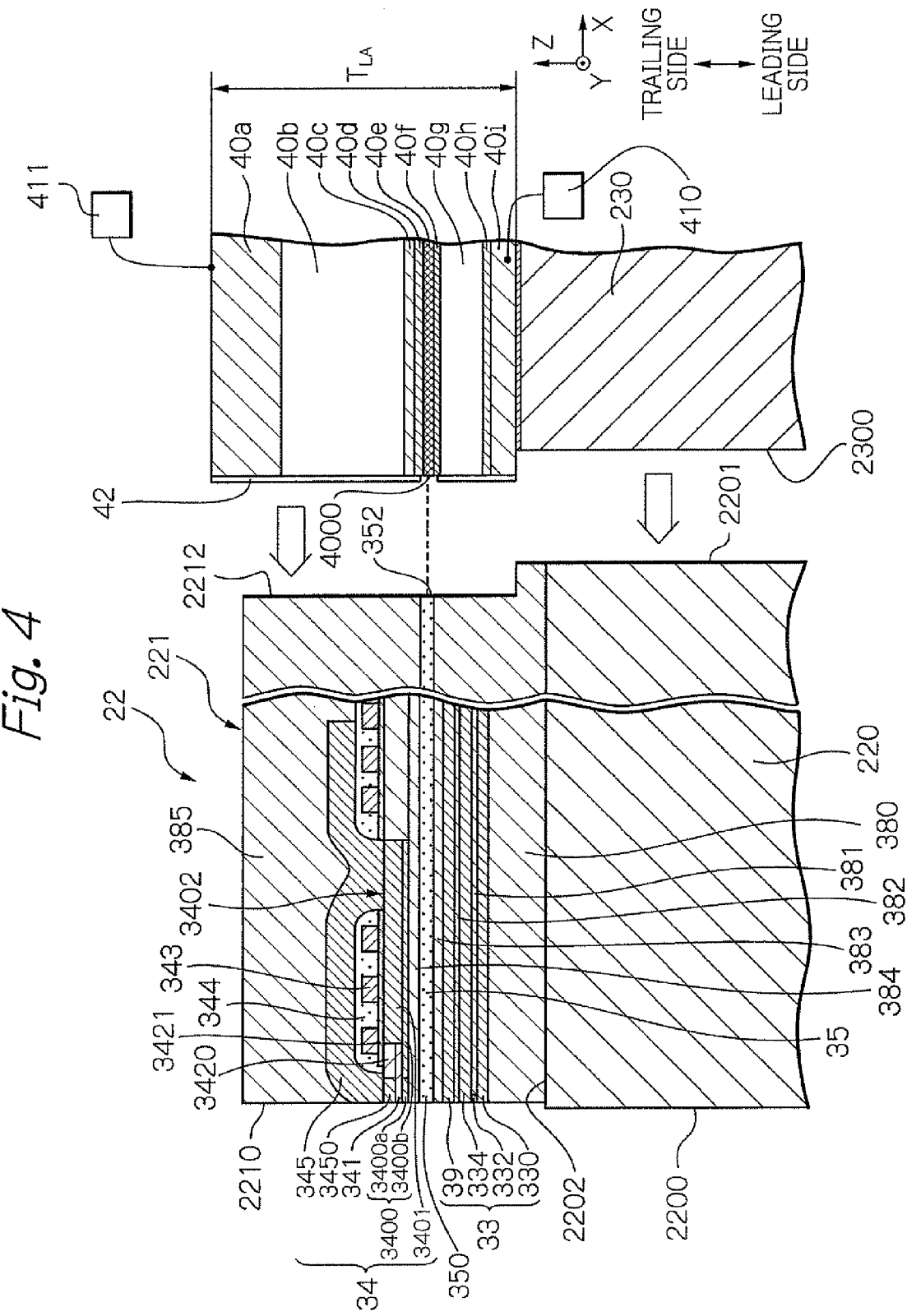
FIG. 4 shows a cross-sectional view taken by plane A in FIG. 2, schematically illustrating a main portion of the thin-film magnetic head.

FIG. 4 shows a cross-sectional view taken by plane A in FIG. 2 schematically illustrating a main portion of the thin-film magnetic head 21.

As shown in FIG. 4, the MR element 33, which is formed on an insulating layer 380 stacked on the element forming surface 2202, includes an MR multilayer 332, a lower shield layer 330, an upper shield layer 334 and an insulating layer 381, and the lower shield layer 330 and the upper shield layer 334 sandwich the MR multilayer 332 and the insulating layer 381. The upper and lower shield layers 334 and 330 prevent the MR multilayer 332 from receiving external magnetic fields as a noise. The upper and lower shield layers 334 and 330 are magnetic layers formed of soft-magnetic materials such as NiFe (Permalloy), FeSiAl (Sendust), CoFeNi, CoFe, FeN, FeZrN or CoZrTaCr, or the multilayer of at least two of these materials, with thickness of approximately 0.5 to 3 µm.

The MR multilayer 332 is a magneto-sensitive part for detecting a signal magnetic field by using MR effect. The MR multilayer 332 may be, for example, a current-in-plane giant magnetoresistive (CIP-GMR) multilayer that utilizes CIP-GMR effect, a current-perpendicular-to-plane giant magnetoresistive (CPP-GMR) multilayer that utilizes CPP-GMR effect or a tunnel magnetoresistive (TMR) multilayer that utilizes TMR effect. The MR multilayer 332 that utilizes any MR effect described above can detect the signal magnetic field from the magnetic disk with high sensitivity. In the case that the MR multilayer 332 is a CPP-GMR multilayer or a TMR multilayer, the upper and lower shield layers 334 and 330 also act as electrodes. In case that the MR multilayer 332 is a CIP-GMR multilayer, insulating layers are provided between the MR multilayer 332 and upper/lower shield layers 334/330 respectively, and a MR lead layer, which is electrically connected to the MR multilayer 332, is provided.

In case of TMR multilayer, for example, the MR multilayer 332 may have a stacked structure in which sequentially stacked are: an antiferromagnetic layer made of, for example, IrMn, PtMn, NiMn or RuRhMn, with thickness of approximately 5 to 15 nm; a magnetization-direction-fixed layer (pinned layer) in which two ferromagnetic layers such as CoFe sandwich a non-magnetic metal layer such as Ru therebetween, and the direction of the magnetization is fixed by the antiferromagnetic layer; a tunnel barrier layer made of a non-magnetic dielectric material obtained by the process that a metal film such as Al or AlCu, for example, with thickness of approximately 0.5 to 1 nm is oxidized by oxygen introduced into the vacuum equipment, or is naturally oxidized; and a magnetization-direction-free layer (free layer) having a double-layered structure of a ferromagnetic material such as CoFe, for example, with thickness of approximately 1 nm and a ferromagnetic material such as NiFe, for example, with thickness of approximately 3 to 4 nm, which has a tunnel exchange interaction with the pinned layer through the tunnel barrier layer.

Also as shown in FIG. 4, the electromagnetic transducer 34 is designed for perpendicular magnetic recording, and includes a main magnetic pole layer 340, a gap layer 341, a writing coil layer 343, a coil insulating layer 344 and a write shield layer 345.

The main magnetic pole layer 340 is provided on an insulating layer 384 made of an insulating material such as $Al_2O_3$ (alumina), and acts as a magnetic path for converging and guiding a magnetic flux, which is excited by a write current flowing through the writing coil layer 343, toward the magnetic recording layer (perpendicular magnetization layer) of the magnetic disk 10. The main magnetic pole layer 340 has a double-layered structure in which a main magnetic pole 3400 and a main pole body 3401 are stacked sequentially and magnetically coupled with each other. The main magnetic pole 3400 is isolated by being surrounded with an insulating layer 384 formed of an insulating material such as $Al_2O_3$ (alumina). The main magnetic pole 3400 reaches the head-part end surface 2210, and includes: a main pole front end 3400a with a small width $W_P$ (FIGS. 3b and 3c) in the track width direction; and a main pole rear end 3400b located at the rear of the main pole front end 3400a and having a width in the track width direction larger than that of the main pole front end 3400a. Here, the small width $W_P$ of the main pole front end 3400a enables a fine write magnetic field to be generated, so that the track width can be set to be a very small value adequate for higher recording density.

As shown in FIGS. 3b and 3c, the shape of the main magnetic pole layer 340 around the head-part end surface 2210 has an upside-down trapezoidal shape with a longer edge on the trailing side (+Z direction). The width $W_P$ of the main pole front end 3400a is the length of the longer edge, which determines the width of track formed on the perpendicular magnetization layer of the magnetic disk. The width $W_P$ is, for example, in the range of approximately 0.05 to 0.5 µm. To put it differently, the end surface of the main magnetic pole layer 340 has a bevel angle θ on the head-part end surface 2210. Providing the bevel angle θ works for preventing unwanted writing or erasing to the adjacent tracks due to the influence of a skew angle of the head, which arises from the movement of rotary actuator. The bevel angle may be, for example, approximately 15°.

Backing to FIG. 4, the main magnetic pole 3400 is formed of a soft-magnetic material with saturation magnetic flux density higher than that of the main pole body 3401, which is, for example, an iron alloy containing Fe as a main component, such as FeNi, FeCo, FeCoNi, FeN or FeZrN. The thickness of the main magnetic pole 3400 is, for example, in the range of approximately 0.1 to 0.8 µm.

The gap layer 341 forms a gap provided for separating the main magnetic pole layer 340 from the write shield layer 345 in the region near the head-part end surface 300. The gap layer 341 is formed, for example, of a non-magnetic insulating material such as $Al_2O_3$ (alumina), $SiO_2$ (silicon dioxide), AlN (aluminum nitride) or DLC, or formed of a non-magnetic conductive material such as Ru (ruthenium). The thickness of the gap layer 341 determines the spacing between the main magnetic pole layer 340 and the write shield layer 345, and is, for example, in the range of approximately 0.01 to 0.5 µm.

The writing coil layer 343 is formed on an insulating layer 3421 made of an insulating material such as $Al_2O_3$ (alumina), in such a way to pass through in one turn at least between the main magnetic pole layer 340 and the write shield layer 345, and has a spiral structure with a back contact portion 3402 as a center. The writing coil layer 343 is formed of a conductive material such as Cu (copper). The writing coil layer 343 is covered with a coil insulating layer 344 that is formed of an insulating material such as a heat-cured photoresist, and the coil insulating layer 344 electrically isolates the writing coil layer 343 from the main magnetic pole layer 340 and the write shield layer 345.

The writing coil layer 343 has a monolayer structure in the present embodiment, however, may have a two or more layered structure or a helical coil shape. Further, the number of turns of the writing coil layer 343 is not limited to that shown in FIG. 4, and may be, for example, in the range from two to seven.

The write shield layer 345 reaches the head-part end surface 2210, and acts as a magnetic path for the magnetic flux returning from a soft-magnetic under layer that is provided under the perpendicular magnetization layer of the magnetic disk. The thickness of the write shield layer 345 is, for example, approximately 0.5 to 5 μm. Further, the write shield layer 345 has a trailing shield 3450 that is a portion facing to the main magnetic pole layer 340. The trailing shield 3450 also extends to the head-part end surface 2210, and is provided for receiving the magnetic flux spreading from the main magnetic pole layer 340. The trailing shield 3450, according to the present embodiment, is planarized together with an insulating layer 3420 and the main pole body 3401, and has a width in the track width direction larger than the width of the main pole rear end 3400b and the main pole body 3401 as well as the main pole front end 3400a. This trailing shield 3450 causes the magnetic field gradient between the end portion of the trailing shield 3450 and the main pole front end 3400a to be steeper. As a result, a jitter of signal output becomes smaller, and therefore, error rates during read operation can be reduced. The write shield layer 345 is formed of a soft-magnetic material, and especially, the trailing shield 3450 is formed of a material with high saturation magnetic flux density such as NiFe (Permalloy) or formed of an iron alloy the same as the main magnetic pole.

Further, in the present embodiment, an inter-element shield layer 39, which is sandwiched by the insulating layers 382 and 383, is provided between the MR element 33 and the electromagnetic transducer 34. The inter-element shield layer 39 plays a role for shielding the MR element 33 from the magnetic field generated from the electromagnetic transducer 34, and may be formed of the same soft-magnetic material as the upper and lower shield layers 334 and 330. The inter-element shield layer 39 is not indispensable, and embodiments without the inter-element shield layer 39 could be in the scope of the present invention. Further, a backing coil portion may be provided between the inter-element shield layer 39 and the waveguide 35. The backing coil portion is a coil portion for generating magnetic flux to negate a magnetic flux loop that is generated from the electromagnetic transducer 34 and passes through the upper and lower shield layers 334 and 330 of the MR element 33. Thus, the backing coil portion intends to suppress wide adjacent track erasure (WATE), that is, unwanted writing or erasing to the magnetic disk.

According to FIG. 4, the laser diode 40 has, in the present embodiment, a multilayered structure in which an n-electrode 40a, an n-GaAs substrate 40b, an n-InGaAlP clad layer 40c, a first InGaAlP guide layer 40d, an active layer 40e formed of multiguantum well (InGaP/InGaAlP) or the like, a second InGaAlP guide layer 40f, a p-InGaAlP clad layer 40g, a p-electrode base layer 40h, and a p-electrode 40i are sequentially stacked. Reflective layers, which are made of, for example, $SiO_2$ or $Al_2O_3$, are formed on the front and rear cleaved surfaces of the multilayered structure for exciting the oscillation by total reflection, and an opening is provided at the position of the active layer 40e on one reflective layer 42, and an emission center 4000 is included in the opening.

The wavelength $\lambda_L$ of the radiated laser light may be, for example, in the range of approximately 400 to 650 nm. Because the thin-film magnetic head according to the invention does not use a near-field light generating element, and is free from the limitation of available wavelength by the material of the near-field light generating element, thus, available range of the wavelength is wider. The thickness $T_{LA}$ of the laser diode 40 is approximately 60 to 200 μm.

An electric source provided within the magnetic disk drive apparatus can be used for driving the laser diode 40. In fact, the magnetic disk drive apparatus usually has an electric source with applying voltage of, for example, approximately 2V, which is sufficient for the laser oscillation. The amount of electric power consumption of the laser diode 40 is, for example, in the order of several tens mW, which can be covered sufficiently by the electric source provided within the magnetic disk drive apparatus. In practice, a predetermined voltage is applied between the terminal electrode 410 electrically connected to the p-electrode 40i and the terminal electrode 411 electrically connected to the n-electrode 40a by the electric source to oscillate the laser diode 40. Then, laser light is radiated from the opening including the emission center 4000 of the reflective layer 42.

The laser diode 40 and terminal electrodes 410 and 411 are not limited to the above-described embodiment. For example, the n-electrode 40a may be adhered on the optical source unit installation surface 2302 of the unit substrate 230, by turning the electrodes of the laser diode 40 upside down. Further, the laser diode 40 may have another structure using other semiconducting materials such as GaAlAs system. The same structure as diodes usually used for optical disk storages may be adopted for the laser diode 40. Further, the laser diode 40 can be provided somewhere in the magnetic disk drive apparatus instead of attaching on the thin-film magnetic head 21, and in this case, the emission center of the laser diode and the end surface 352 of the waveguide 35 is connected using an optical fiber.

The advantage of the heat-assisted magnetic recording according to the invention is described with the comparison between the prior art and the invention below.

Figure 5A:
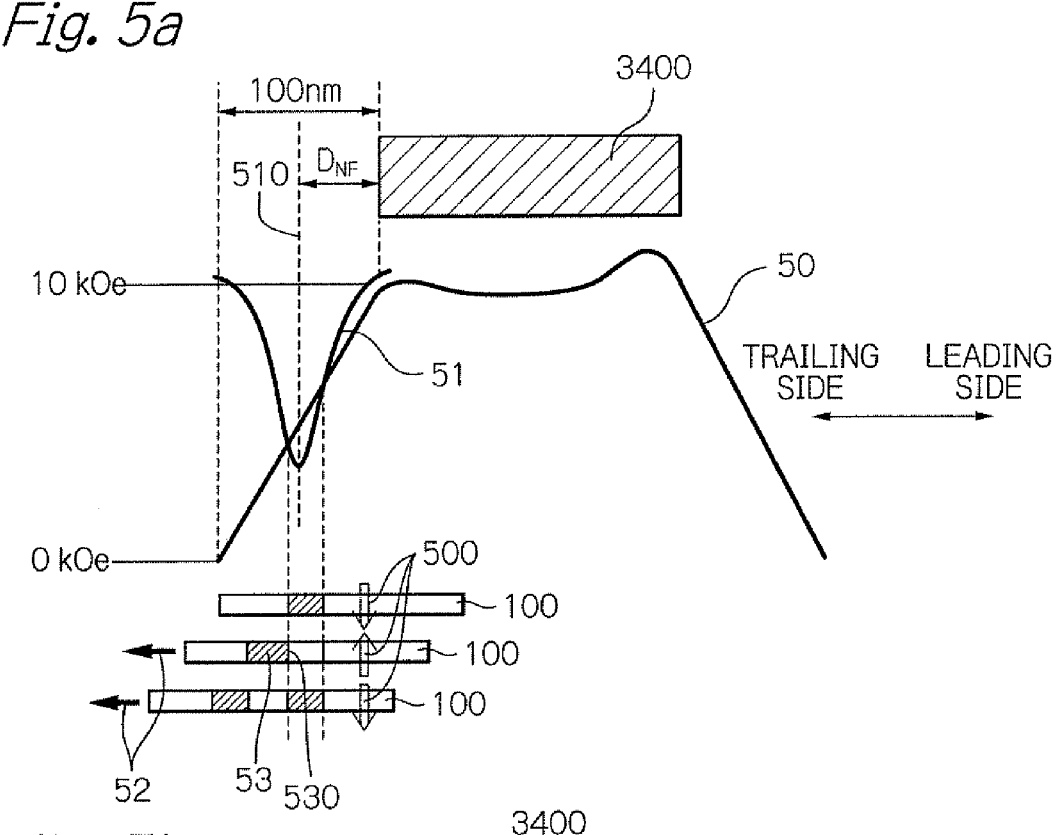
FIGS. 5a and 5b are outline drawings of an effective write magnetic field profile and an anisotropy field profile by the heat-assisted magnetic recording using a near-field light generating element according to the prior art.
Figure 5B:
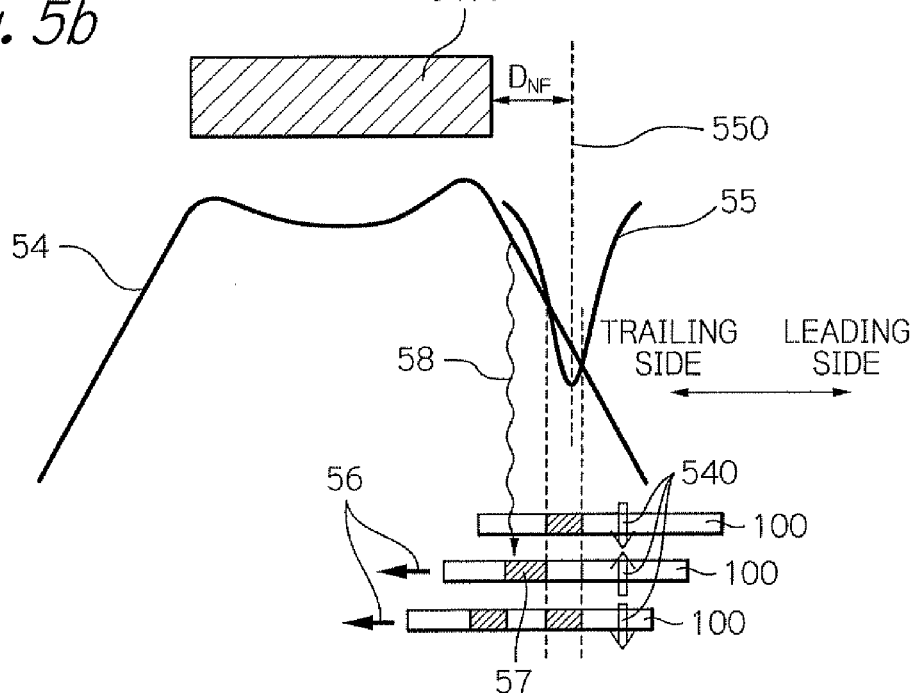

FIGS. 5a and 5b are outline drawings of an effective write magnetic field profile and an anisotropy field profile by the heat-assisted magnetic recording using the near-field light generating element according to the prior art. FIG. 5a shows the case that the near-field light generating element is placed on the trailing side with reference to the main magnetic pole 3400 of the head, and FIG. 5b shows the case that the near-field light generating element is placed on the leading side with reference to the main magnetic pole 3400 of the head.

The effective write magnetic field profile is an intensity distribution of an effective write magnetic field in the direction along the track at the recording layer of the magnetic disk. The effective write magnetic field means a write magnetic field, which works on the recording layer effectively to reverse the magnetization of the recording layer to form recording bits, from the main magnetic pole. The anisotropy field profile is a distribution of an anisotropy field in the direction along the track at the recording layer when the anisotropy field is reduced by irradiating a part of the recording layer of the magnetic disk with the laser light for heat-assisted recording. It is noted that both the effective write magnetic field profile and the anisotropy field profile are drawn simplified shape in FIGS. 5a and 5b, and the detail of the effective write magnetic field profile is described later using FIG. 7.

As shown in FIG. 5a, firstly the case that the near-field light generating element is placed on the trailing side with reference to the main magnetic pole 3400 of the head is explained. In this case, an effective write magnetic field profile 50 and an anisotropy field profile 51 are arranged such that two profiles cross at two cross points placed on the trailing side gradient region of the effective write magnetic field profile 50. Here the anisotropy field profile 51 has a precipitous valley like shape due to a local near-field light from the near-field light generating element. Under this arrangement, the reversal of magnetization of the recording layer 100 of the magnetic disk is possible in the region that the anisotropy field profile 51 is less than the effective write magnetic field profile 50. (The anisotropy field $H_K$<the effective write magnetic field $H_{EFF}$) Magnetization transition regions 530 are generated on the recording layer 100 by reversing the direction 500 of the write magnetic field, while the recording layer 100 is moving to a direction indicated by an arrow 52 by rotating the magnetic disk. Magnetization transition regions 530 become recording bits boundaries, and thus recording bits 53 are generated.

In this case, an irradiating center 510 of the near-field light from the near-field light generating element need to be placed close enough to the trailing side end surface of the main magnetic pole 3400. For example, in case the trailing side gradient of the effective write magnetic field profile 50 is 100 Oe(Oersted)/nm and the maximum of the effective write magnetic field is 10 kOe, the distance, which the effective write magnetic field becomes 0 from the maximum, is 100 nm. Therefore, if the effective write magnetic field more than or equal to 5 kOe is required for writing to the magnetic disk, the distance $D_{NF}$ between the trailing side end surface of the main magnetic pole 3400 and the irradiating center 510 of the near-field light generating element need to be adjusted less than or equal to 50 nm. Further, in case the gradient of the magnetic field need to be increased, for example, by 500 Oe/nm for high recording density, the distance $D_{NF}$ need to be shortened.

On the other hand, the near-field light generating element generally generates a near-field light by receiving a light, which is propagated through the waveguide. The waveguides is formed by surrounding a higher refractive index region (core) using a lower refractive index region (clad) as described above. To keep functions as the waveguide, the thickness of each region need to be set almost the same as or more than the wavelength of the light to be used. In case of the blue laser, which is normally used for the high density optical recording, the thickness of the clad need to be set approximately 400 nm or more, and the light propagation efficiency is dramatically degraded using the clad thinner than 400 nm. As a result, the near-field light generating element, which is provided at the end surface of the waveguide, cannot be placed close enough to the end surface of the main magnetic pole, and thus it is very difficult to shorten the distance $D_{NF}$.

In case the near-field light generating element is placed on the leading side with reference to the main magnetic pole 3400 of the head, as shown in FIG. 5b, an effective write magnetic field profile 54 and an anisotropy field profile 55 are arranged such that two profiles cross at two cross points placed on the leading side gradient region of the effective write magnetic field profile 54. In this case, recording bits can be unstable in addition to the difficulty of shortening the distance $D_{NF}$. In fact, recording bits 57 are written firstly, then moved to the main magnetic pole 3400, and exposed to a higher effective write magnetic field 58. As a result, magnetization transition regions of recording bits 57 are distorted, and recording bits 57 may be damaged.

Then, the heat-assisted magnetic recording using a light supplying unit, which supplies a laser light with a big spot diameter, instead of the near-field light generating element to avoid problems raised by using the near-field light generating element is explained.

Figure 6A:
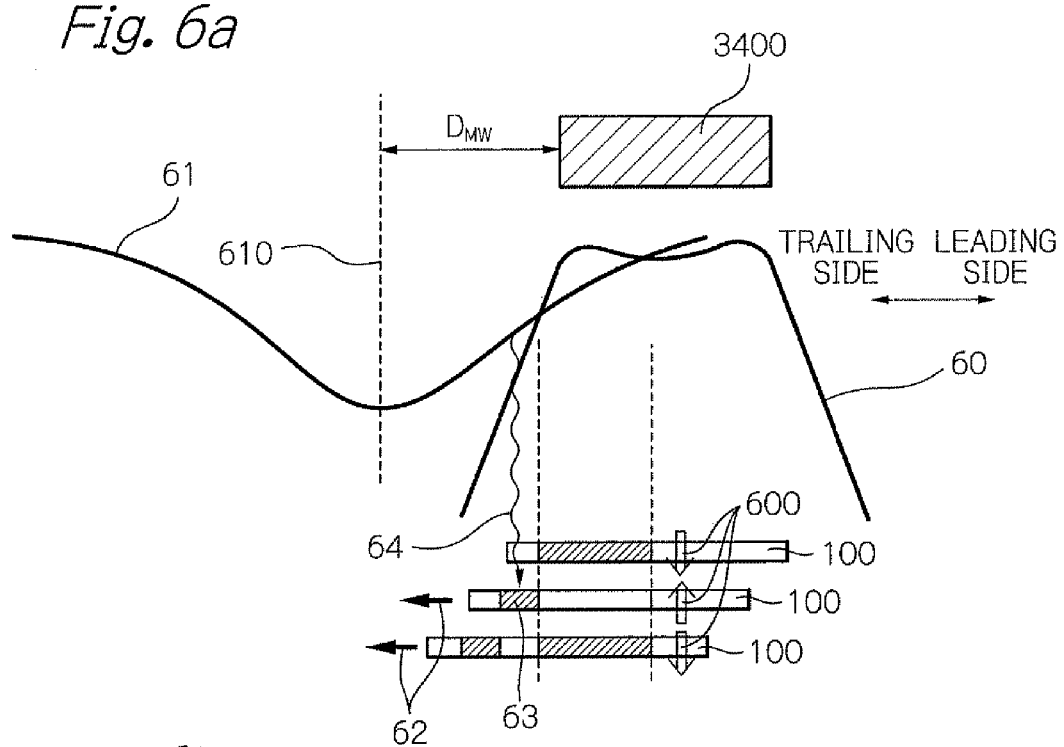
FIGS. 6a and 6b are outline drawings of an effective write magnetic field profile and an anisotropy field profile by the heat-assisted magnetic recording using a light supplying unit, which supplies a laser light with a big spot diameter, instead of a near-field light generating element.
Figure 6B:
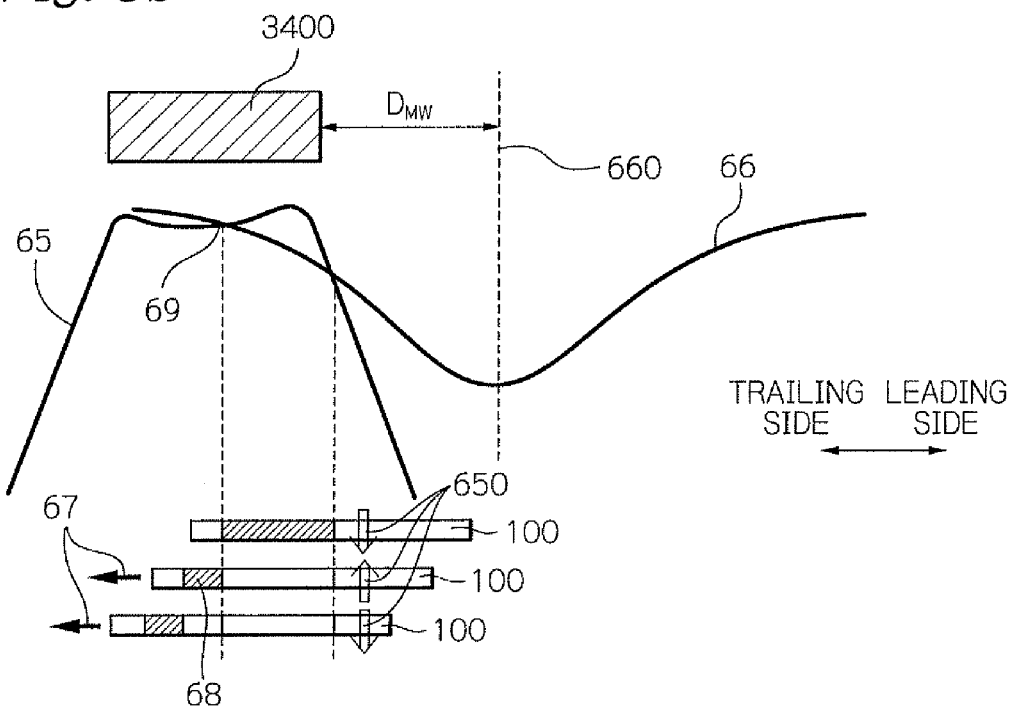

FIGS. 6a and 6b are outline drawings of an effective write magnetic field profile and an anisotropy field profile by the heat-assisted magnetic recording using a light supplying unit supplying a laser light with a big spot diameter instead of a near-field light generating element. FIG. 6a shows the case that the light supplying unit is placed on the trailing side with reference to the main magnetic pole 3400 of the head, and FIG. 6b shows the case that the light supplying unit is placed on the leading side with reference to the main magnetic pole 3400 of the head.

As shown in FIG. 6a, firstly the case that the light supplying unit is placed on the trailing side with reference to the main magnetic pole 3400 of the head is explained. In this case, an anisotropy field profile 61 has a wider valley like shape than the anisotropy field profiles 51 and 55 shown in FIGS. 5a and 5b, which use the near-field light generating element. An effective write magnetic field profile 60 and the anisotropy field profile 61 are arranged such that two profiles cross at two cross points, where one point is placed on the trailing side gradient region of the effective write magnetic field profile 60, and another point is placed on the flat region of the profile 60. Thus, a distance $D_{MW}$ between the trailing side end surface of the main magnetic pole 3400 and an irradiating center 610 of the light supplying unit is not required to be short as the distance $D_{NF}$ shown in FIGS. 5a and 5b. Under this arrangement, the reversal of magnetization of the recording layer 100 of the magnetic disk is possible in the region that the anisotropy field profile 61 is less than the effective write magnetic field profile 60. (The anisotropy field $H_K$<the effective write magnetic field $H_{EFF}$) Recording bits 63 are formed on the recording layer 100 by reversing a direction 600 of the write magnetic field, while the recording layer 100 is moving to a direction indicated by an arrow 62 by rotating the magnetic disk.

However, in this case, recording bits 63 come close to the irradiating center 610 of the light supplying unit after being written, and enter a higher temperature area 64. As a result, magnetization transition regions of recording bits 63 are distorted, and recording bits 63 may be damaged.

In case the light supplying unit is placed on the leading side with reference to the main magnetic pole 3400 of the head, as shown in FIG. 6b, an effective write magnetic field profile 65 and an anisotropy field profile 66 are arranged such that two profiles cross at two cross points, where one point is placed on the leading side gradient region of the effective write magnetic field profile 65, and another point 69 is placed on the flat region of the profile 65. In this case, magnetization transition regions of recording bits 68 are eventually decided by the effective write magnetic field and the anisotropy field around the cross point 69, where the gradients of both profiles 65 and 66 are very small. Here the small gradient of the anisotropy field profile 66 means that the gradient of the temperature is small. As a result, magnetization transition regions of recording bits 68 are decided under the condition that gradients of both the magnetic field and temperature are very small, and it is very difficult to achieve high line recording density.

As described above, it is very difficult to achieve heat-assisted magnetic recording, which can be applied for high line recording density, by just using a light supplying unit, which outputs a light with big spot diameter. The heat-assisted magnetic recording according to the invention is described below.

FIG. 7 is an outline drawing for explaining an effective write magnetic field profile having a projecting region on the leading side.

As shown in FIG. 7, a magnetic field component $H_P$ is a component perpendicular to the recording layer surface (X direction), a magnetic field component $H_T$ is a component along the track in the recording layer surface (Z direction), and a magnetic field component $H_L$ is a component to the track width direction in the recording layer surface (Y direction), of the write magnetic field generated by the main magnetic pole 3400 of the electromagnetic transducer 34. Here the write magnetic field components $H_P$, $H_T$ and $H_L$ are values at the center of the recording layer 100 (perpendicular magnetization layer) of the magnetic disk 10 in the laminated direction (X direction) of the recording layer 100.

The write magnetic field components $H_P$, $H_T$ and $H_L$ can be expressed by profiles 70, 71 and 72, where a transverse axis shows a position L along the track (Z direction). As easily understood by the profile 72, the write magnetic field component $H_L$ is normally very low compared to other write magnetic field components $H_P$ and $H_T$. The effective write magnetic field $H_{EFF}$, which works on the recording layer effectively to form recording bits by inverting the magnetization of the recording layer, is expressed by three write magnetic field components $H_P$, $H_T$ and $H_L$ as follows.

$$H_{EFF} = ((H_P^2 + H_T^2)^{1/3} + H_L^{2/3})^{3/2} \qquad (1)$$

This is because the write magnetic field components $H_T$ of Z direction and $H_L$ of Y direction also contribute to the reversal of magnetization by inducing the precession movement of the magnetization, while it is obvious that the write magnetic field component $H_P$ contributes to reverse the magnetization direction of the recording layer 100, for example, by changing its direction from upward direction (+X direction) to downward direction (−X direction). Therefore, the effective write magnetic field $H_{EFF}$ can be expressed by a profile 73, of which traverse axis is the position L. The effective write magnetic field profile 73 has a projecting region 730 on the leading side (−Z direction) due to the write magnetic field components $H_T$ and $H_L$. From a qualitative standpoint, it can be understood the projecting region 730 is caused, because the write magnetic field intend to concentrate to the edge area of the main magnetic pole 3400.

The height and width of the projecting region 730 can be controlled by adjusting the size, shape and distance of the main magnetic pole 3400 and the trailing shield 3450 of the electromagnetic transducer 34. Especially, experimental result shows it is possible to achieve the maximum value of the effective write magnetic field at the projecting region 730 exceeding 25 kOe, which is big enough, when the thickness TP (FIG. 3) of the fore end portion, which has a high saturation magnetic flex density, of the main magnetic pole 3400 is more than or equal to 0.3 μm.

According to the invention, the heat-assisted magnetic recording is performed using the effective write magnetic field profile, which is adjusted to have the projecting region that is high enough.

Figure 8A:
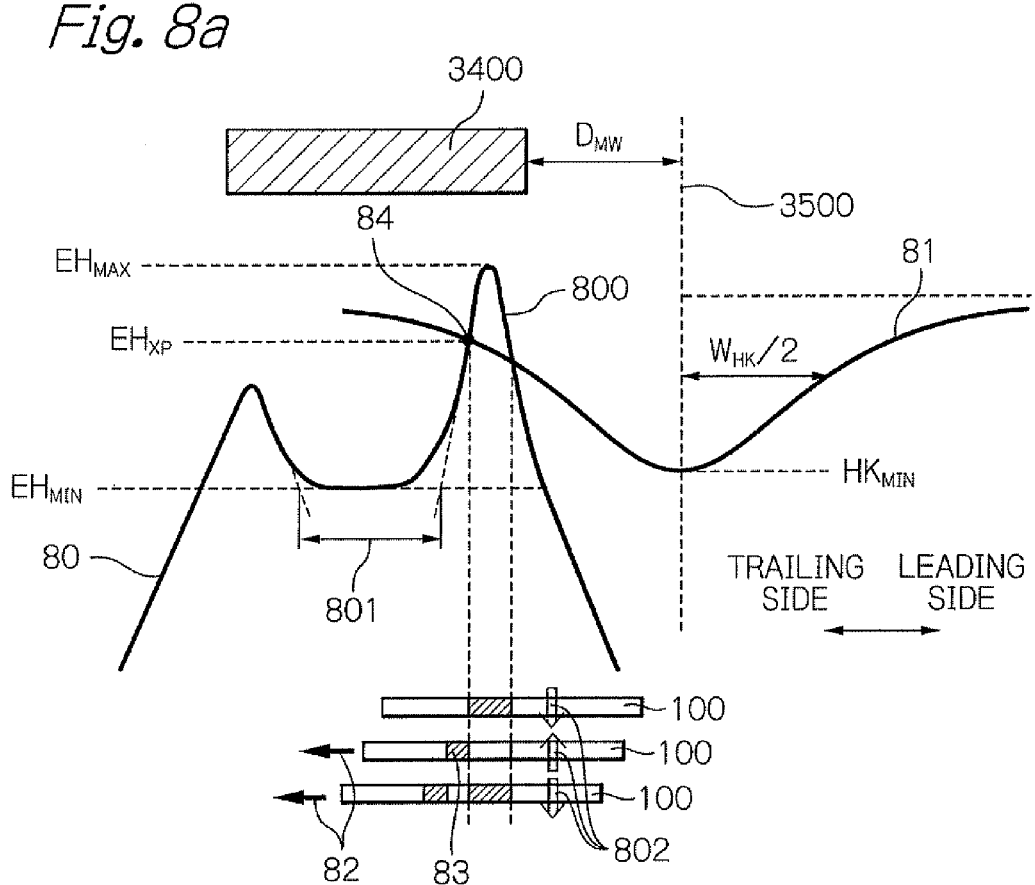
FIGS. 8a and 8b are outline drawings of an effective write magnetic field profile and an anisotropy field profile for explaining the basis of the heat-assisted magnetic recording according to the invention.
Figure 8B:
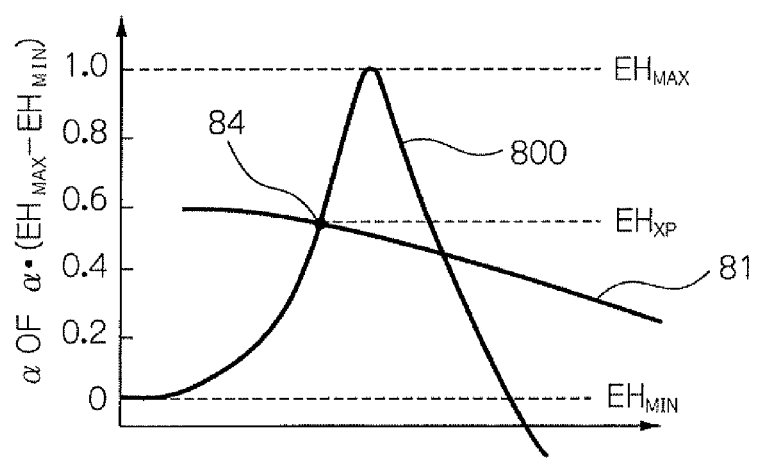

FIGS. 8a and 8b are outline drawings of an effective write magnetic field profile and an anisotropy field profile for explaining the basis of the heat-assisted magnetic recording according to the invention. In the heat-assisted magnetic recording explained hereinafter, the thin-film magnetic head, in which the spot center 3500 of the waveguide 35 is provided on the leading side of the main magnetic pole 3400 as shown in FIGS. 2, 3b, 3c and 4, is used.

As shown in FIG. 8, an effective write magnetic field profile 80 for the heat-assisted magnetic recording according to the invention has a projecting region 800 on the leading side. An anisotropy field profile 81 has a wider valley like shape than the anisotropy field profiles 51 and 55 shown in FIGS. 5a and 5b, which use the near-field light generating element. Further, the anisotropy field profile 81 is arranged such that it traverses the projecting region 800. Therefore, the effective write magnetic field profile 80 and the anisotropy field profile 81 have a cross point 84, which is placed on the trailing side of the projecting region 800, and a cross point placed on the leading side. Here, a distance $D_{MW}$ between the leading side end surface of the main magnetic pole 3400 and the spot center 3500 of the waveguide 35 is not required to be short as the distance $D_{NF}$ shown in FIGS. 5a and 5b. Under this arrangement, the reversal of magnetization of the recording layer 100 of the magnetic disk is possible in the region that the anisotropy field profile 81 is less than the effective write magnetic field profile 80. (The anisotropy field $H_K$ < the effective write magnetic field $H_{EFF}$) Recording bits 83 are formed on the recording layer 100 by reversing a direction 802 of the write magnetic field, while the recording layer 100 is moving to a direction indicated by an arrow 82 by rotating the magnetic disk.

In this case, magnetization transition regions of recording bits 83 are eventually decided at the trailing side cross point 84 of the projecting region 800, where the gradient of the magnetic field is very big. Thus, magnetization transition regions become steep, and it is possible to make recording bits 83 smaller and to achieve a high line recording density. Moreover, after writing, recording bits 83 are moved away from the spot center 3500 of the waveguide 35, and they are not exposed to high temperature after writing. As a result, magnetizations of recording bits 83 are stable, and it may contribute to improve the signal to noise ratio. As explained above, it is possible to form stable recording bits pattern, which have precipitous magnetization transition regions, without using the near-field light generating element, and to contribute to improve both line recording density and signal to noise ratio.

Next, the limitation of the trailing side cross point 84 on the projecting region 800 is explained. Here the minimum value of a flat region 801 of the effective write magnetic field profile 80 is referred as $EH_{MIN}$, and the maximum value of the projecting region 800 of the effective write magnetic field profile 80 is referred as $EH_{MAX}$. In this case, the value $EH_{XP}$ of the effective write magnetic field at the trailing side cross point 84 on the projecting region 800 favorably satisfies the following condition.

$$0.2(EH_{MAX} - EH_{MIN}) <= EH_{XP} - EH_{MIN} <= 0.8(EH_{MAX} - EH_{MIN}) \qquad (2)$$

In other word, as shown in FIG. 8b, the trailing side cross point 84 on the projecting region 800 is favorably located more than or equal to 0.2 times of the height of the projecting region 800, and less than or equal to 0.8 times of the height of the projecting region 800. With this configuration, the signal to noise ratio is certainly improved as described later with an example.

Further, favorably it satisfies the condition $HK_{MIN} > EH_{MIN}$ according to the heat-assisted magnetic recording of the invention, where, $HK_{MIN}$ is the minimum value of the anisotropy field in the anisotropy field profile 81 as shown in FIG. 8a. The effective write magnetic field of the flat region 801 in the effective write magnetic field profile 80 extends to the track width direction in some degree. It is possible to prevent the adjacent track erasure (ATE), which unintentionally erases the data of adjacent tracks, by setting the minimum anisotropy field value $HK_{MIN}$ of the anisotropy field profile 81 greater than the minimum effective write magnetic field value $EH_{MIN}$ of the flat region 801.

The simulation result of the heat-assisted magnetic recording using the thin-film magnetic head according to the invention is explained below.

Example

As the example, the magnetization state of recording bits pattern was simulated, in case of the heat-assisted magnetic recording of 2100 kFCI (Flux Change per Inch) line recording density. Further, the signal to noise ratio SNR of an output from the MR element 33 is calculated when the MR element 33 reads the recording bits pattern.

For the simulation of the magnetization state, LLG simulation according to Landau-Lifshitz-Gilber equation was used. For the condition of the simulation, the power of the laser source for heat-assisted was 8 mV. The wavelength of the laser light was 650 nm. The spot diameter of the laser light from the waveguide 35 was 800 nm. Moving line velocity of the rotation of the disk 10 was 1.5 m/s. The magnetic spacing, which is a distance between the recording layer surface and end surface of both the MR element 33 and the electromagnetic transducer 34, was 6 nm. Further, the thickness $T_P$ of the fore end part of the main magnetic pole 3400 was 0.3 μm, and the width $W_P$ for the track width direction was 100 nm.

FIG. 9 shows an effective write magnetic field profile of the main magnetic pole 3400 used for the example.

The effective write magnetic field profile shown in FIG. 9 was used for the example. The maximum value $EH_{MAX}$ of the effective write magnetic field of the profile was 27.8 kOe. The minimum value $EH_{MIN}$ of the flat region of the profile was 11.7 kOe. The arrangement of the anisotropy field profile with respect to the effective write magnetic field profile is changed by adjusting the distance $D_{MW}$ between the leading side end surface of the main magnetic pole 3400 and the spot center 3500 of the waveguide 35 in the range of 50 to 650 nm.

The magnetic recording medium was a magnetic disk, in which a soft-magnetic under layer having a thickness of 20 nm, an intermediate layer having a thickness of 5 nm and a recording layer having the thickness of 10 nm were laminated in sequence on a glass substrate. The average grain size of the recording layer was 4 nm, and the standard deviation a of this grain size was 18%. A magnetic anisotropy energy Ku of the recording layer was $2 \times 10^7$ erg/cc. Temperature dependence property of both the magnetic anisotropy energy $K_U$ and saturation magnetization $M_S$ were based on data in Thiele et al., Journal of Applied Physics Vol. 91, No. 10, p. 6595-6600, 2002. The anisotropy field $H_k$ at the room temperature of the recording layer was 40 kOe. Exchange coupling between grains was $10^{-7}$ erg/cm.

Table 1 shows a half width at half maximum $W_{HK}/2$ of the anisotropy field profile, the minimum value $HK_{MIN}$ of the anisotropy field profile and a signal to noise ratio SNR of the read output in various arrangement between the effective write magnetic field profile and the anisotropy field profile. Here, the half width at half maximum $W_{HK}/2$ (FIG. 8a) of the anisotropy field profile is a half value of the width of the anisotropy field profile at the center value of the $HK_{RM}$ and the minimum value $HK_{MIN}$ of the anisotropy field, i.e. 0.5 ($HK_{RM}+HK_{MIN}$), at the room temperature. The intersection level α of Table 1 has a following relation to the effective write magnetic field $EH_{XP}$ at the trailing side cross point 84, where the anisotropy field profile 81 and the projecting region 800 of the effective write magnetic field profile crosses.

$$EH_{XP}=\alpha(EH_{MAX}-EH_{MIN}) \quad (3)$$

In other word, $\alpha=EH_{XP}/(EH_{MAX}-EH_{MIN})$.

TABLE 1

| INTERSECTION LEVEL α | $W_{HK}/2$ (nm) | $HK_{MIN}$ (kOe) | SNR (dB) |
| --- | --- | --- | --- |
| 0.9 | 490 | 12.6 | 3.8 |
| 0.85 | 490 | 12.6 | 4.2 |
| 0.8 | 490 | 12.6 | 9.8 |

TABLE 1-continued

| INTERSECTION LEVEL α | $W_{HK}/2$ (nm) | $HK_{MIN}$ (kOe) | SNR (dB) |
| --- | --- | --- | --- |
| 0.6 | 488 | 12.6 | 11.2 |
| 0.4 | 463 | 13.2 | 12.8 |
| 0.2 | 442 | 15.5 | 10.5 |
| 0.1 | 275 | 23.1 | 3.1 |

Figure 10A:
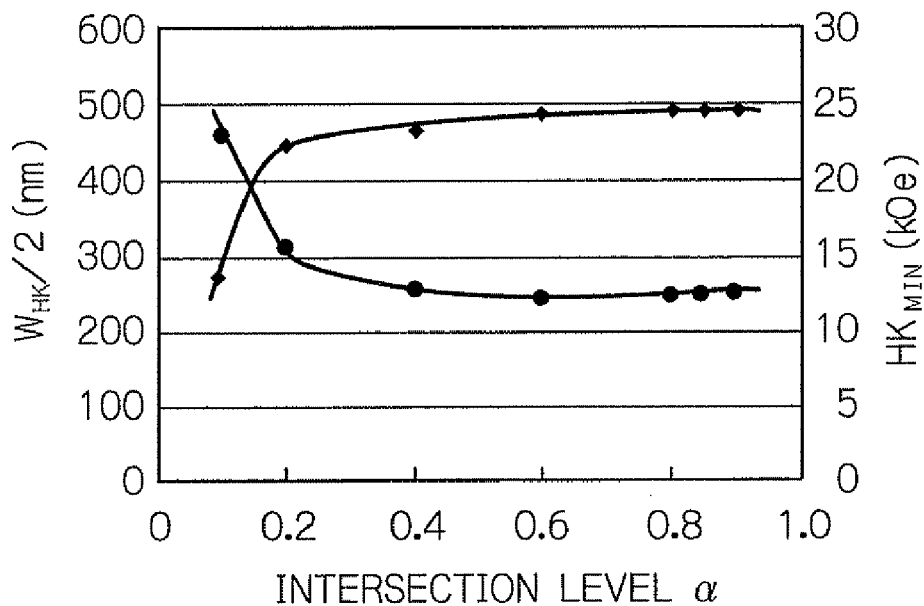
FIG. 10a shows the relation of the intersection level α to both the half width at half maximum $W_{HK}/2$ of the anisotropy field profile and the minimum value $HK_{MIN}$ of the anisotropy field of the simulation result in Table 1.

FIG. 10a shows the relation of the intersection level α to both the half width at half maximum $W_{HK}/2$ of the anisotropy field profile and the minimum value $HK_{MIN}$ of the anisotropy field disclosed in Table 1 of the simulation result. Further FIG. 10b shows the relation of the intersection a level to the signal to noise ratio SNR of the read output disclosed in Table 1 of the simulation result.

According to FIG. 10a and Table 1, in case the intersection level α is in the range of 0.2-0.9, the half width at half maximum $W_{HK}/2$ is big enough, and the minimum value $HK_{MIN}$ of the anisotropy field is small enough. Thus, it is possible to form recording bits by a certain write magnetic field. Because the minimum value $HK_{MIN}$ of the anisotropy field is greater than the minimum value $EH_{MIN}$ of the flat region of the effective write magnetic field profile to be used, i.e. 11.7 kOe, it is possible to prevent ATE as described above. The distance $D_{MW}$ between the leading side end surface of the main magnetic pole 3400 and the spot center 3500 of the waveguide 35 become larger with increasing the intersection level α.

On the contrary, in case the intersection level α is below 0.2, in other word, in case the distance $D_{MW}$ become very small, the half width at half maximum $W_{HK}/2$ of the anisotropy field profile becomes small, and the minimum value $HK_{MIN}$ of the anisotropy field increases, because the some part of the laser light is absorbed by the main magnetic pole 3400. In this case, it becomes difficult to form good recording bits using a certain write magnetic field.

Figure 10B:
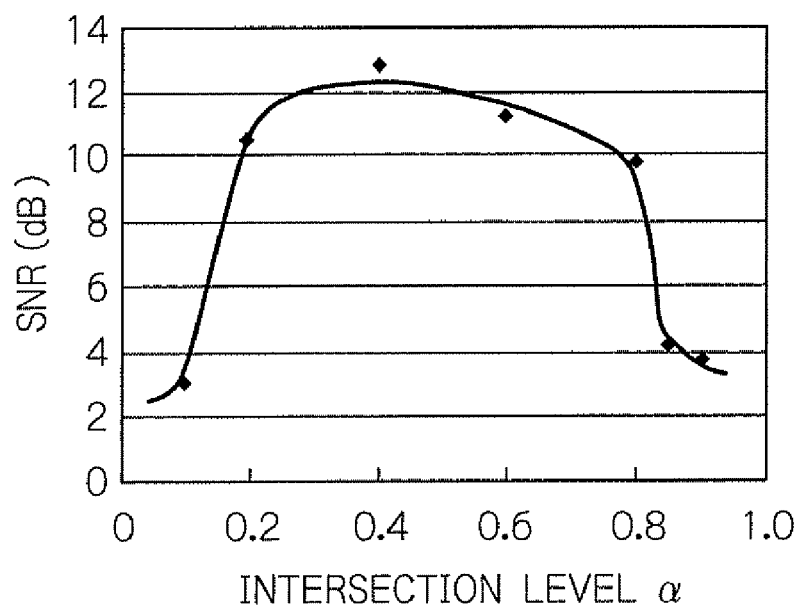
FIG. 10b shows the relation of the intersection level α to the signal to noise ratio SNR of the read output of the simulation result in Table 1.

According to FIG. 10b and Table 1, in case intersection level α is in the range of 0.2-0.8, the signal to noise ratio SNR of the read output is approximately 10 dB or more. However, in case the intersection level α is below 0.2, in other word, in case the distance $D_{MW}$ becomes very small, the signal to noise ratio SNR is extremely degraded. This is because the anisotropy field of the recording layer is not appropriately reduced as described above. Further, in case the intersection level α is above 0.8, the signal to noise ratio SNR is also extremely degraded. This is because the distance $D_{MW}$ between the main magnetic pole 3400 and the spot center 3500 of the waveguide 35 become very large, thus recording bits are formed around base area of the anisotropy field profile, as a result, the enough gradient of the magnetic field is not obtained while forming boundaries of recording bits (magnetization transition regions).

Following points can be understood from the simulation result explained above by using FIGS. 10a and 10b as well as Table 1. It is possible to realize the heat-assisted magnetic recording, which can be applied to high line recording density and improve the signal to noise ratio without using the near-field light generating element, by creating the effective write magnetic field profile having the projecting region on the leading side, by arranging the anisotropy field profile such that it traverses the projecting region, and by setting the effective write magnetic field $EH_{XP}$ at the trailing side cross point on the projecting region to satisfy the condition $0.2(EH_{MAX}-EH_{MIN}) \leq EH_{XP}-EH_{MIN} \leq 0.8(EH_{MAX}-EH_{MIN})$. With this configuration, for example, it is possible to achieve the recording density more than 1 Tbits/in$^2$.

All the foregoing embodiments are by way of example of the present invention only and not intended to be limiting, and many widely different alternations and modifications of the present invention may be constructed without departing from the spirit and scope of the present invention. Accordingly, the present invention is limited only as defined in the following claims and equivalents thereto.

The invention claimed is:

1. A thin-film magnetic head formed on an element forming surface of a substrate comprising:
   a waveguide for leading a light for heat-assist to a magnetic recording medium; and
   a write head element formed on a trailing side of the waveguide and having a magnetic pole for applying a write magnetic field to the magnetic recording medium,
   wherein a write magnetic field profile has a projecting region on a leading side, where the write magnetic field profile is a intensity distribution of the write magnetic field from the magnetic pole along a track in a recoding layer of the magnetic recoding medium, and
   an anisotropy field profile traverses the projecting region of the write magnetic field profile, where the anisotropy field profile is a distribution of an anisotropy field along the track when the anisotropy field is reduced by irradiating the light from the waveguide on a part of the recoding layer.

2. The thin-film magnetic head according to claim 1, wherein a value $EH_{XP}$ of the write magnetic field at a trailing side cross point on the projecting region of the write magnetic field profile and the anisotropy field profile satisfies a relation of $0.2(EH_{MAX}-EH_{MIN})<=EH_{XP}-EH_{MIN}<=0.8(EH_{MAX}-EH_{MIN})$, where $EH_{MIN}$ is the minimum write magnetic field value of a flat region of the write magnetic field profile, and $EH_{MAX}$ is the maximum write magnetic field value of the projecting region.

3. The thin-film magnetic head according to claim 2, wherein the minimum anisotropy field value $HK_{MIN}$ of the anisotropy field profile satisfies a relation of $HK_{MIN}>EH_{MIN}$.

4. The thin-film magnetic head according to claim 1, wherein the waveguide does not include a near-field light generating element, the waveguide acts as a core, and an insulating layer surrounding the waveguide acts as a clad.

5. The thin-film magnetic head according to claim 1, wherein a light source for generating the light for heat-assist is provided on or adjacent to a end surface opposite to a medium facing surface of the waveguide.

6. A head gimbal assembly comprising:
   a suspension; and
   the thin-film magnetic head according to claim 1 attached on the suspension.

7. A magnetic recording apparatus comprising:
   a head gimbal assembly having a suspension and the thin-film magnetic head according to claim 1 attached on the suspension;
   at least one magnetic recording medium;
   a recording and light-emitting control circuit for controlling both a emitting operation of the light being propagated through the waveguide and a write operation performed by the thin-film magnetic head to at least one magnetic recording medium.

8. The magnetic recording apparatus according to claim 7, wherein a value $EH_{XP}$ of the write magnetic field at a trailing side cross point on the projecting region of the write magnetic field profile and the anisotropy field profile satisfies a relation of $0.2(EH_{MAX}-EH_{MIN})<=EH_{XP}-EH_{MIN}<=0.8(EH_{MAX}-EH_{MIN})$, where $EH_{MIN}$ is the minimum write magnetic field value of a flat region of the write magnetic field profile, and $EH_{MAX}$ is the maximum write magnetic field value of the projecting region.

9. The magnetic recording apparatus according to claim 8, wherein the minimum anisotropy field value $HK_{MIN}$ of the anisotropy field profile satisfies a relation of $HK_{MIN}>EH_{MIN}$.

10. The magnetic recording apparatus according to claim 7, wherein the waveguide does not include a near-field light generating element, the waveguide acts as a core, and an insulating layer surrounding the waveguide acts as a clad.

11. The magnetic recording apparatus according to claim 7, wherein a light source for generating the light for heat-assist is provided on or adjacent to a end surface opposite to a medium facing surface of the waveguide.

12. A heat-assisted magnetic recording method comprising the steps of:
   setting a write magnetic field profile such that it has a projecting region on a leading side, where the write magnetic field profile is a intensity distribution of the write magnetic field along a track in a recoding layer of a magnetic recording medium;
   reducing an part of an anisotropy field such that an anisotropy field profile traverses the projecting region of the write magnetic field profile by irradiating a light on a part of the recording layer, where the anisotropy field profile is a distribution of the anisotropy field along the track in the recording layer, and the part of the recording layer is a leading side part with reference to a center of the write magnetic field profile.

13. The heat-assisted magnetic recording method according to claim 12, wherein a value $EH_{XP}$ of the write magnetic field at a trailing side cross point on the projecting region of the write magnetic field profile and the anisotropy field profile satisfies a relation of $0.2(EH_{MAX}-EH_{MIN})<=EH_{XP}-EH_{MIN}<=0.8(EH_{MAX}-EH_{MIN})$, where $EH_{MIN}$ is the minimum write magnetic field value of a flat region of the write magnetic field profile, and $EH_{MAX}$ is the maximum write magnetic field value of the projecting region.

14. The heat-assisted magnetic recording according to claim 13, wherein the minimum anisotropy field value $HK_{MIN}$ of the anisotropy field profile satisfies a relation of $HK_{MIN}>EH_{MIN}$.

* * * * *